Jan. 16, 1962 A. C. HAGG ET AL 3,017,072
DYNAMOELECTRIC MACHINE
Filed May 27, 1958
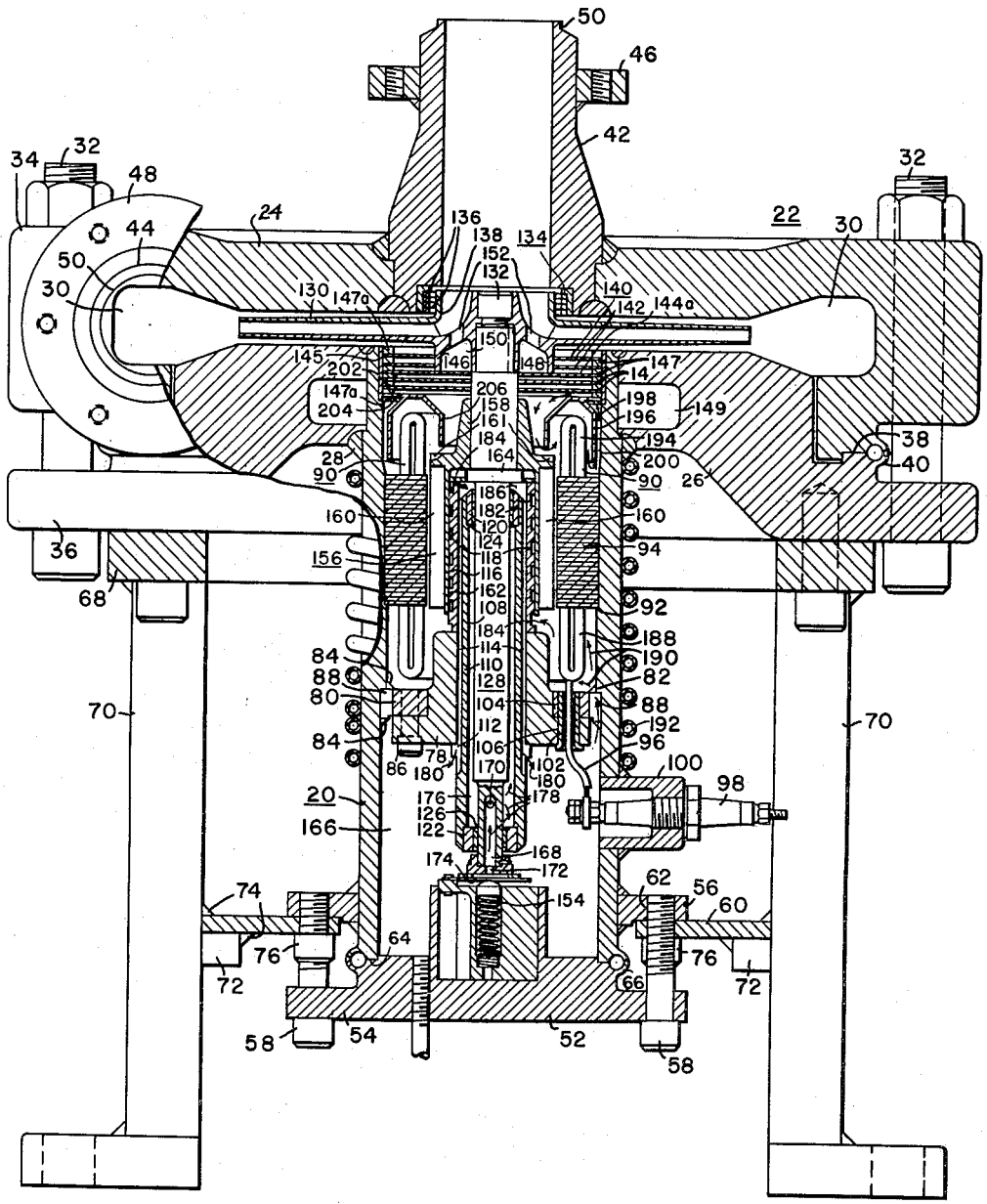
WITNESSES
John E. Heasly Jr.
Wm. B. Sellers
INVENTORS
Arthur C. Hagg &
Benjamin Cametti
BY
Donald J. Smith
ATTORNEY United States Patent Office 3,017,072
Patented Jan. 16, 1962

3,017,072
DYNAMOELECTRIC MACHINE
Arthur C. Hagg, Pittsburgh, and Benjamin Cametti, Forest Hills, Pa., assignors to Westinghouse Electric Corporation, East Pittsburgh, Pa., a corporation of Pennsylvania
Filed May 27, 1958, Ser. No. 738,081
6 Claims. (Cl. 230—118)

The present invention relates to a dynamoelectric machine and more particularly to a sealed motor-pump unit adapted for pumping high temperature fluid at high ambient pressures.

In the following specification, the aforementioned motor-pump unit is described particularly for use in circulating gaseous materials but obviously the motor-pump unit can be utilized for pumping other fluids.

In previous motor-pump units, no adequate means have been provided for maintaining a bearing lubricant, utilized in the motor section of the motor-pump unit, separately from the main fluid stream which is circulated by the unit. As a result, previous motor-pump units frequently employ a portion of the main fluid stream for lubricating the bearings of the unit. These arrangements, however, usually resulted in the employment of fluids having poor lubricating characteristics. In other known motor-pump units, complicated and expensive bearing and sealing arrangements have had to be utilized in those applications wherein it was essential to maintain a motor bearing lubricant separately of the main fluid stream conducted through the motor-pump unit.

As a result of the difficulty in lubricating the bearings of previous motor-pump designs, complicated bearing structures have been utilized from time to time to permit usage of main fluid stream materials as bearing lubricant, or of other materials which are compatable with the main fluid stream, but all of which usually are poor lubricants.

In view of the foregoing, an object of the present invention is to provide a novel and efficient motor-pump unit.

Another object of the invention is the provision of a novel motor-pump unit of the character described, adapted in certain applications for circulating fluids maintained at elevated temperatures and high ambient pressures.

A further object of the invention is to provide a motor-pump unit or other dynamoelectric machine with improved bearing and bearing-lubricating arrangements.

Still another object of the invention is to provide a motor-pump unit with novel means for separating the bearing lubricant utilized in the motor section thereof from the main fluid stream circulated by the motor-pump unit.

A still further object of the invention is to provide a motor-pump unit or other dynamoelectric machine having improved and novel means for cooling the interior structure of the motor section, and more particularly the stator end-turns and the rotor thereof.

Yet another object of the invention is to provide a dynamoelectric machine with a cantilever type rotor and means associated with the rotor for removing electrical losses therefrom from the interior cavity thereof.

Another object of the invention is to provide a dynamoelectric machine with novel means for cooling the interior structures thereof and for confining the lubricant employed therein to those areas within the machine which are in the region of the bearings thereof.

These and other objects, features and advantages of the invention will be elaborated upon during the forthcoming description of an exemplary modification of the invention with the description being taken in conjunction with the accompanying drawing showing a longitudinal cross-sectional view of one form of motor-pump unit as arranged in accordance with the teachings of this invention.

Referring now more particularly to the drawing, the illustrative form of the invention shown therein comprises a motor housing 20 and a pump casing 22 joined thereto. The pump casing 22 includes a volute section 24 and a lower flange member 26 which is seal welded to the upper end of the motor housing 20 through the use of an annular bearing weld 28. The volute section 24 and the flange member 26 are joined together to complete the pumping volute chamber 30, by means of a plurality of mounting bolts 32 inserted through appropriate apertures of the flanges 34 and 36 thereof.

The flanges 34 and 36 extend respectively outwardly of the volute section 24 and the flange member 26 so that the bolts 32 lie outwardly of the junction 38 between the volute section 24 and the flange member 26. With this arrangement, the junction 38 can be hermetically sealed by means of the weld container arrangement indicated generally by the reference character 40 and which may be of the type described in Patent 2,805,789, issued September 10, 1957 to E. J. Kreh, Jr. et al. and assigned to the assignee of the present application.

The volute section 24 is provided with a centrally disposed inlet port 42 and with a tangentially arranged outlet port 44. The motor-pump unit can be coupled into the system for which it is being used by means of mounting flanges 46 and 48 secured adjacent the outward ends respectively of the inlet port 42 and the outlet port 44. The outward ends of each of the inlet and outlet ports neckdown as denoted by reference characters 50 to permit application of a circular sealing weld (not shown) when the motor-pump unit is hermetically sealed within the aforesaid system.

The lower end of the motor housing 20 also is hermetically sealed by means of enclosure member 52 which is provided with an outwardly extending mounting flange 54. The mounting flange 54 is bolted to a complementary mounting flange 56 secured adjacent the lower end of the housing 20. In furtherance of this purpose, a plurality of mounting bolts 58 are inserted through suitable apertures formed in the enclosure flange 54 and the supporting ring 60 and are threaded into tapped apertures 62 of the housing flange 56. The junction 64 between the lower housing end and the closure 52 is hermetically sealed in this arrangement by means of a weld container arrangement 66, in a manner similar to that described heretofore in connection with the weld container 40.

In this arrangement of the invention, the motor-pump unit is mounted for operation in a generally vertical position and is supported in this position primarily by means of an annular member 68 bolted to the underside of the flange member 26 of the casing 22 and a plurality of upstanding legs or supports 70. The aforementioned ring member 60 is secured to each of these legs 70 by means of brackets 72 and welds 74. The ring member 60 thus affords auxiliary support to the motor housing 20 through its mounting flange 56 to which the ring member is secured by means of cap screws 76.

At an intermediate position within the housing 20, a cylindrical flanged supporting member denoted generally by the reference character 78 is secured. The flange portion of the supporting member 78 is joined to an annular member 80 which is positioned within the housing 20 by abutment against an offset 82 formed at the inner periphery of the housing 20. The annular member 80 is joined to the inner wall of the housing 20, for example by welding, as indicated at 84 and is joined to the flanged supporting member 78 by a plurality of bolts 86. In this arrangement the annular member 80 is grooved transversely at its outer periphery as denoted by the reference characters 88 to provide flow passages for the purposes described hereinafter.

A stator assembly denoted generally by the reference character 90, likewise is mounted within the motor housing 20 at a position in this example upwardly of the supporting member 78. The stator assembly 90 is spaced from the supporting member 78 by means of another housing offset 92 formed on the inner wall surface of the housing 20 and abutting the lower end of the stator base or core 94. The electrical leads 96 of the stator assembly are coupled to a pair of insulated terminals 98, with only one such terminal being shown in the drawing. The terminals 98 are threaded respectively into central tapped apertures of cup-shaped receptacle members 100 which communicate with the interior of the motor housing 20. The leads 96 are joined to the inward ends of the insulated terminals 98 and extend through ceramic insulator sleeves 102 which extend respectively through pairs of aligned apertures 104 and 106 of the annular member 80 and the flanged supporting member 78.

A bearing supporting tube assembly 108 is inserted in this example centrally and longitudinally through the supporting cylinder 78. The bearing supporting tube includes an inner sleeve 110 provided with an outer annular stop member 112 and a plurality of longitudinally extending grooves 114. The inner sleeve 110 is secured to the supporting cylinder 78, for example as by brazing, shrink-fitting, or by welding (not shown), after first being positioned therein by means of the annular stop 112. The bearing supporting tube assembly 108 also includes an outer sleeve 116 which desirably is secured to the outer periphery of the inner sleeve 110 as by brazing or shrink-fitting after being positioned upon the inner sleeve 110 by abutment of the outer sleeve 116 against the upper end of the supporting cylinder 78. The outer sleeve 116 is provided at its outer periphery with a spiral groove 118 extending along the length of the outer sleeve 116. The spiral groove 118 and the longitudinal groove 114 afford flow channels, the purposes of which are described in detail hereinafter.

Adjacent the upper and lower ends respectively of the bearing supporting tube assembly 108 are mounted annular bearing sleeves 120 and 122, respectively. The bearings 120 and 122 are disposed for engagement with journal bearings 124 and 126 which are disposed on a driving shaft 128. The driving shaft 128 thus is mounted for rotation by means of the bearings 120 and 122 and the bearing supporting tube assembly 108. The driving shaft 128 extends upwardly into the interior of the pump casing 22 and to the upper end of the driving shaft 128 is secured a pumping impeller 130 through the use of a central mounting bolt 132. The pumping impeller 130 thus is positioned for rotation within the volute 30 of the pump casing 22.

The high pressure fluid issuing from the outlet edges of the impeller 130 is prevented from returning to the suction or inlet port 42 of the motor-pump unit through the use of a labyrinth type seal 134. The seal 134 comprises a plurality of spaced stainless steel discs 136 having an annular configuration and surrounding the eye 138 of the impeller 130. In a similar manner, high pressure fluid is prevented from entering the motor housing 20 by means of another labyrinth seal 140. The seal 140 includes a plurality of annular discs 142 and 144 which fit relatively closely with the outer peripheries of the impeller hub 146 and the driving shaft 128 respectively. The discs 142 and 144 are likewise formed from stainless steel and are spaced longitudinally along the impeller hub 146 and the driving shaft 128. Spacing between the discs 142 and 144 is maintained by a plurality of washers 147 inserted respectively between the discs. The assembly of discs 142 and 144 and washers 147, together with an end-turn shield 196 described hereinafter, are secured to a retaining cylinder 145 as by shrink-fitting or by spot-welding the utmost ones 147a of the washers to the retaining cylinder. The annular discs 136, 142 and 144 are made relatively thin to prevent binding between the discs and the adjacent rotating parts should contact occur. The lower labyrinth seal 140 affords limited leakage between the volute 30 and the interior of the motor housing 20 and thus serves to equalize pressures therein.

The labyrinth seal 140 also serves as a thermal barrier between the pump casing 22 and the motor housing 20 and their respective associated components. The spaces between the individual discs 142 and 144 afford static layers of fluid which minimize the development of convection currents within the seal 140. The spacing of the annular discs 142 and 144 also minimizes thermal conduction between the pump casing and the interior of the housing 20. On the other hand, radiated heat is minimized by fabricating the annular discs 142 and 144 from polished stainless steel or other corrosion resistant structural material. The transfer of heat between the pump casing 22 and motor housing 20 is further minimized by provision of an annular insulating cavity 149 containing static air or other fluid. The combined thermal barrier 140—149 is described and claimed in a copending application of the instant invention, entitled "Totally Enclosed Canned Motor-Pump," filed July 1, 1954, now Patent 2,887,061, and assigned to the present assignee.

One of the annular discs 144a of the labyrinth seal 140 seats relatively closely against the lower circular edge 148 of the impeller hub 146 and thus encloses a suction chamber 150 within the impeller hub 146. The suction chamber 150 is coupled to the eye 138 of the impeller by means of ports 152. Use of the suction chamber 150 and the connecting ports 152 counteracts the force of upward thrust imparted to the impeller 130 during the operation thereof by the relatively high pressure existing in the pumping volute 30 and the motor housing 20. The driving shaft 128, however, is positioned by the thrust bearing arrangement disposed adjacent the lower end of the driving shaft 128 and denoted generally by the reference character 154.

Adjacent the lower labyrinth seal 140, a cantilever type rotor 156 is mounted on the driving shaft 128. The rotor 156 is secured to the driving shaft 128 by means of a single end plate and hub member 158 which is shrink-fitted to the driving shaft 128 or, alternatively, is secured thereto by means of set screws (not shown). The rotor 156 desirably is of a windingless or squirrel cage type to avoid external connections and, in this arrangement, comprises a plurality of salient poles 160. The rotor 156 is thus adapted for rotation upon energizing the stator assembly 90 and in furtherance of this purpose the salient poles 160 of the rotor 156 are disposed relatively closely to the inner periphery or bore of the stator core 94. The supporting structure 162 of the rotor is generally cylindrical, is open at one end, and is joined as aforesaid at its other end to the end plate and hub member 158. The inner periphery of the rotor 156 fits relatively closely with the outer sleeve 116 of the bearing supporting tube assembly 108. The inner wall of the rotor supporting structure 162 thus encloses the spiral groove 118 of the outer sleeve 116 to form a helical channel between the inner surface of the rotor 156 and the adjacent outer sleeve 116, the purpose of which channel is described hereinafter. The use of the cantilever rotor 156, which at least partially surrounds the bearing tube 108, in addition permits adequate spacing of the upper and lower bearing arrangements 120—124 and 122—126 in order to lend stability to the driving shaft 128 and the impeller 130 secured thereto. The end plate and hub member 158 is positioned upon the driving shaft 128 by abutment with a flange portion 164 formed integrally with the driving shaft 128.

The rotor 156, the impeller 130 and the driving shaft 128 thus are supporting for rotation by means of the bearing supporting tube assembly 108 and the upper and lower sleeve bearings 120 and 122 and associated components. These bearings are lubricated with oil or other suitable lubricant withdrawn from the oil reservoir indicated generally by the reference character 166 maintained in the lower end portion of the housing 20. During operation of the motor-pump unit oil is withdrawn from the reservoir 166 by a suitable oil pump and is conducted to the bearing surfaces of the bearings 120—124 and 122—126. Any oil or other lubricant atomized or otherwise issuing from the bearings is returned to the oil reservoir 166 and prevented from entering the main fluid stream of the pump casing 22 by means presently to be described.

One form of lubricant pump includes a longitudinally extending cavity 168 formed in the lower end of the driving shaft 128. Adjacent the upper end of the cavity 168, a pair of transverse openings 170, with one such opening being shown in the drawing, extend into the cavity 168 through the adjacent wall portion of the driving shaft 128. During rotation of the driving shaft 128 the centrifugal force of the lubricant moving radially and outwardly through the openings 170 draws lubricant through the cavity 168, and through suitable passages 172 and 174 of the thrust bearing arrangement 154. From the oil pump openings 170, lubricant flows upwardly and downwardly, respectively, through the annular space 176 between the inner sleeve 110 of the bearing tube assembly 108 and the driving shaft 128, to the upper shaft bearing arrangement 120—124 and to the lower bearing 122—126, as indicated by flow arrows 178. From the lower bearing 122—126 the lubricant flows directly into the reservoir 166. From the upper bearing 120—124, however, the lubricant issuing therefrom usually is in the form of small droplets and, when the motor-pump unit described herein is employed for pumping gaseous materials or the motor section thereof is provided with a gaseous filling, means are provided for facilitating the collection and conduction of these droplets downwardly through the flow channels formed by the longitudinal grooves 114 of the inner sleeve 110.

As shown in the drawing, the grooves 114 are enclosed along the major portions of their length by the outer sleeve 116 of the bearing tube 108 and the supporting cylinder 78. The oil flowing upwardly from the bearing 120—124 is then conducted downwardly through the enclosed grooves 114 from the lower ends of which the lubricant flows into the reservoir 166 as denoted by the flow arrows 180. In furtherance of this purpose, the upward edges of the sleeve bearing 120 and of the inner sleeve 110 are beveled, as denoted by the reference character 182, in order to cause the lubricant to flow outwardly into the upper openings of the enclosed grooves 114.

The flow of oil or other lubricant downwardly through the enclosed grooves 114 is facilitated by providing means for forcing a portion of the gaseous material enclosed within the motor section downwardly through the enclosed grooves 114 to utilize this gaseous material as a medium for conveying the smaller droplets or particles of lubricant issuing from the upper bearing 120—124 to the oil reservoir 166. Use of the conveying means prevents the droplets of vapor or lubricant from entering the main fluid stream of the motor-pump or from accumulating elsewhere in the motor section.

One form of such conveying means includes the enclosed spiral groove arrangement 118 formed as aforesaid between the inner periphery of the rotor 156 and the outer sleeve 116 of the bearing tube 108. The clearance between the inner wall of the rotor 156 and the adjacent outside diameter of the outer sleeve 116 is made relatively small and the movement of the inner rotor surface relative to the stationary spiral groove 118, during operation of the motor-pump, forms an effective viscosity type pump which furnishes a flow of gaseous material from the interior of the housing 20 to the upper end of the upper bearing 120—124 as indicated by flow arrows 184. The effluent material from the upper end of the spiral groove 118 then flows into annular passage 186 adjacent the beveled end portions of the bearing 120 and the inner supporting sleeve 110 and then flows downwardly through the enclosed grooves 114. The flow of gaseous material in this manner thus collects any vapor or droplets of lubricant issuing from the bearing 120—124 and conveys them downwardly through the grooves 114 which open adjacent the surface of the oil reservoir 166 as indicated by arrows 180. Adjacent the reservoir 166 which occupies a cooler portion of the housing 20, the lubricant vapor or droplets condense or coalesce from the gaseous stream and fall into the oil reservoir 166. The gaseous vehicle then flows upwardly through the flow channels 88, formed as described previously at the outer periphery of the supporting ring 80, around the lower stator end-turns 188, and thence to the lower opening of the enclosed spiral groove 118, as indicated by flow arrows 190. In this manner, the viscosity pump, including the spiral groove 188 and associated components, serves also to cool the lower stator end-turns 188 during operation of the motor-pump and also the upper bearing 120—124 and the inner periphery of the rotor 156. Additional means for removing electrical losses from the stator assembly 90 is provided in the form of a coolant coil 192 which is wrapped upon the outer periphery of the housing 20. Suitable connections (not shown) are provided for coupling the coil 192 to a source of suitable coolant. The coil 192 desirably is secured in heat conductive relation to the outer surface of the housing 20 by means of a suitable heat-conductive braze or high temperature solder, for example, a silver solder.

The upper end-turns 194 of the stator 90 are cooled by means of convection currents induced through the use of a circular shield 196 of generally U-shaped cross section which partially surrounds the end-turns 194. The gaseous fluid maintained within the housing 20 is then caused to flow around the stator end-turns 194 as indicated by flow arrows 198 by a blower 161 formed integrally with the motor hub member 158. The gaseous fluid flows by the end-turns 194 and through the annular space 200 between the outer periphery of the end-turn shield 196 and the adjacent housing wall where the fluid loses a portion of its heat to the housing 20 and hence to the stator cooling coil 192. From the space 200 the fluid flows through a plurality of apertures 202 formed in a supporting plate 204 of the stator shield 196 and downwardly through the central channel 206 of the shield 196 and back to the blower 161.

In the event that the fluid handled by the motor-pump unit is corrosive insofar as the internal components of the motor housing 20 are concerned, an inert gaseous filling can be maintained within the housing 20 at a pressure greater than that existing within the pumping fluid at 30. Such gaseous filling can be selected from the group including helium or nitrogen or the like. The selection of the inert gaseous filling, of course, will depend, in those applications wherein it is utilized, upon the characteristics of the gas which can be tolerated within the main fluid stream, since limited leakage thereof into the main stream would be permitted by the labyrinth seal 140. In those applications wherein the fluid handled by the motor-pump unit is a liquid, the latter-mentioned gaseous filling can be utilized provided a limited amount of the gaseous filing can be tolerated within the liquid stream.

From the foregoing, it will be apparent that a novel and efficient form of a motor-pump unit has been disclosed herein. However, numerous changes and embodiments of the motor-pump will occur to those skilled in the art without departing from the spirit and scope of the invention. Moreover, it is to be understood that certain features of the invention can be employed without a corresponding use of another feature thereof. Therefore, the foregoing descriptive material and the drawing are to be taken as illustrative of the invention and should not be interpreted as limitative thereof. For example, it will be obvious that certain features of the invention, such as the viscosity pump arrangement including the spiral groove 118, the bearing lubrication arrangement, and the manner of supporting the drive shaft and its bearings can be incorporated in ordinary electric motors or in other types of dynamoelectric machinery.

Accordingly, what is claimed as new is:

1. In a dynamoelectric machine, the combination comprising a housing, an elongated supporting tube mounted within said housing, a driving shaft extending through said supporting tube, anti-frictional means mounted within said supporting tube on the inner periphery thereof and engaging said driving shaft, a hollow cantilever rotor secured to said driving shaft at a position closely adjacent at least a portion of said supporting tube, the hollow portion of said rotor at least partially surrounding said supporting tube, said supporting tube having coolant passages formed in said portion thereof for conducting coolant therethrough to the inner periphery of said rotor, means for circulating coolant through said passages, a stator assembly, and means for mounting said assembly at a position juxtaposed to said rotor.

2. In a dynamoelectric machine, the combination comprising an upstanding elongated housing, a bearing supporting tube mounted longitudinally within said housing, a driving shaft disposed longitudinally within said housing and extending through said bearing tube, anti-frictional means mounted within said bearing tube on the inner periphery thereof for engaging said driving shaft, said driving shaft being spaced from said bearing tube to provide lubricant flow channels between said driving shaft and said bearing tube, a lubricant reservoir formed adjacent the lower end of said housing, lubricant pumping means coupled to said driving shaft for supplying lubricant through said flow channels to said anti-frictional means, longitudinal lubricant flow passages formed in said bearing tube for conducting lubricant from said anti-frictional means to said reservoir, a cantilever rotor joined to said driving shaft for rotation therewith at a position outwardly adjacent the upper end of said bearing tube, the hollow portion of said rotor surrounding a portion of said bearing tube, said bearing tube fitting relatively closely with the adjacent inner periphery of said rotor and having a spiral groove formed in the outer periphery of said bearing tube and extending the length of said rotor, said groove being thus arranged to circulate a gaseous medium contained within said housing through said groove during operation of said machine to said anti-frictional means and through said lubricant flow passages, whereby lubricant vapor droplets are returned to said reservoir from said anti-frictional means, a stator assembly, and means for mounting said assembly at a position juxtaposed to said rotor.

3. In a dynamoelectric machine, the combination comprising a housing, an elongated bearing supporting tube tube mounted within said housing, a driving shaft extending through said supporting tube, anti-frictional means mounted within said supporting tube at the inner periphery thereof and engaging said driving shaft, a hollow cantilever rotor secured to said shaft at a position adjacent an end of said tube, the hollow portion of said rotor at least partially surrounding said supporting tube, means secured to the outer surface of said tube for circulating a cooling medium adjacent the inner surface of said rotor a stator assembly, and means for mounting said assembly at a position juxtaposed to said rotor.

4. In a dynamoelectric machine, the combination comprising a housing, a bearing supporting tube, means for mounting said supporting tube within said housing, a driving shaft, anti-frictional means mounted within said supporting tube at the inner periphery thereof, said driving shaft extending through said supporting tube and mounted for rotation upon said anti-frictional means, a cantilever rotor secured to said driving shaft adjacent said supporting tube, said rotor surrounding at least a portion of said tube and enclosing said anti-frictional means, means for inducing a flow of fluid to said anti-frictional means and to the inner periphery of said rotor to remove heat therefrom, a stator assembly, means for mounting said assembly at a position juxtaposed to said rotor.

5. In a dynamoelectric machine, the combination comprising a housing, a bearing supporting tube, means for mounting said supporting tube within said housing, a driving shaft, anti-frictional means mounted within said supporting tube at the inner periphery thereof, said driving shaft extending through said supporting tube and mounted for rotation upon said anti-frictional means, a rotor secured to said driving shaft, a stator mounted within said housing at a position juxtaposed to said rotor, said supporting tube having flow passages extending therethrough and opening adjacent the end-turns of said stator, and means for inducing flow of fluid through said flow passages to the end-turns of said stator to remove heat therefrom and from said anti-frictional means.

6. In a dynamoelectric machine, the combination comprising a housing, a bearing supporting tube, means for mounting said supporting tube within said housing, a driving shaft, anti-frictional means mounted within said supporting tube at the inner periphery thereof, said driving shaft extending through said supporting tube and mounted upon said anti-frictional means, said bearing tube having a spiral groove on the outer periphery thereof and longitudinal flow passages extending therethrough, a cantilever rotor secured to said driving shaft and enclosing said spiral groove and said anti-frictional means, the inner periphery of said rotor fitting relatively closely with the outer periphery of the adjacent portion of said bearing tube whereby rotation of said rotor relative to said spiral groove induces flow of fluid through said groove and said passages to remove heat from said rotor and from said anti-frictional means, a stator assembly, and means for mounting said assembly at a position juxtaposed to said rotor.

References Cited in the file of this patent
UNITED STATES PATENTS

| | | |
|---|---|---|
| 2,053,425 | Else | Sept. 8, 1936 |
| 2,234,571 | McCormack | Mar. 11, 1941 |
| 2,280,886 | Brace | Apr. 28, 1942 |
| 2,687,695 | Blom et al. | Aug. 31, 1954 |